(12) United States Patent  (10) Patent No.:  US 9,135,644 B1
Chau  (45) Date of Patent:  *Sep. 15, 2015

(54) ORIENTATION OF PANORAMAS AND PANORAMA SELECTION BASED ON AD BIDDING

(75) Inventor: Stephen Chau, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1041 days.

This patent is subject to a terminal disclaimer.

(21) Appl. No.: 13/229,290

(22) Filed: Sep. 9, 2011

(51) Int. Cl.
*G06Q 30/02* (2012.01)

(52) U.S. Cl.
CPC ........ *G06Q 30/0261* (2013.01); *G06Q 30/0275* (2013.01)

(58) Field of Classification Search
USPC ...................... 705/14.71, 14.57, 14.73, 14.63
See application file for complete search history.

(56) References Cited

U.S. PATENT DOCUMENTS

| | | | |
|---|---|---|---|
| 2006/0241859 A1* | 10/2006 | Kimchi et al. | 701/208 |
| 2007/0083408 A1* | 4/2007 | Altberg et al. | 705/7 |
| 2010/0138294 A1* | 6/2010 | Bussmann et al. | 705/14.49 |
| 2012/0054035 A1* | 3/2012 | Nam et al. | 705/14.58 |

* cited by examiner

*Primary Examiner* — Naresh Vig
(74) *Attorney, Agent, or Firm* — Lerner, David, Littenberg, Krumholz & Mentlik, LLP (57) ABSTRACT

Systems, methods, and computer storage mediums for orienting a panoramic image of a geolocation to display an advertiser's location are provided. An exemplary method includes, first, determining a geolocation of a point on a map, where the point is based on a user action. A panoramic image associated with the geolocation is retrieved. An orientation bid is also retrieved from a collection of orientation bids, where the orientation bid is associated with an advertiser and includes an image orientation direction and a geographical boundary that encompasses the geolocation. The panoramic image is displayed with the image's initial orientation is determined by the image orientation direction.

21 Claims, 9 Drawing Sheets

ORIENTATION OF PANORAMAS AND PANORAMA SELECTION BASED ON AD BIDDING

BACKGROUND

Panoramic images of geolocations may be viewed based on a geolocation selected by a user. The user commonly selects geolocations by choosing a point on a map. Once loaded, the panoramic image may be shown with an initial orientation direction determined by a default value, such as north.

BRIEF SUMMARY

Panoramic images of geolocations often capture places of business. Thus, these images may be used to direct a user to an advertiser's physical location. To direct a user to the advertiser's location, orientation bids may be retrieved and used to set the initial orientation of a panoramic image. The orientation bid may be retrieved based on a number of factors such as, for example, the geolocation corresponding to the panoramic image.

The embodiments described below include systems, methods, and computer storage mediums for orienting a panoramic image of a geolocation to display an advertiser's location. An exemplary method includes, first, determining a geolocation of a point on a map, where the point is based on a user action. A panoramic image associated with the geolocation is retrieved. An orientation bid is also retrieved from a collection of orientation bids, where the orientation bid is associated with an advertiser and includes an image orientation direction and a geographical boundary that encompasses the geolocation. The panoramic image is displayed with the image's initial orientation determined by the image orientation direction.

Further features and advantages of the embodiments described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

In the following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

Embodiments described herein make reference to orienting a panoramic image of a geolocation. Because panoramic images can provide fields of view up to and including 360 degrees, orienting a panoramic image refers to setting the image's field of view to a number of degrees from a default field of view when the image is displayed.

This Detailed Description is divided into sections. The first and second sections describe example system and method embodiments that may be used to direct a user to an image of an advertiser's geolocation. The third section describes exemplary interfaces that can be used to carry out the embodiments described herein. The fourth section describes an example computer system that may be used to implement the embodiments described herein.

Example System Embodiments

Figure 1:
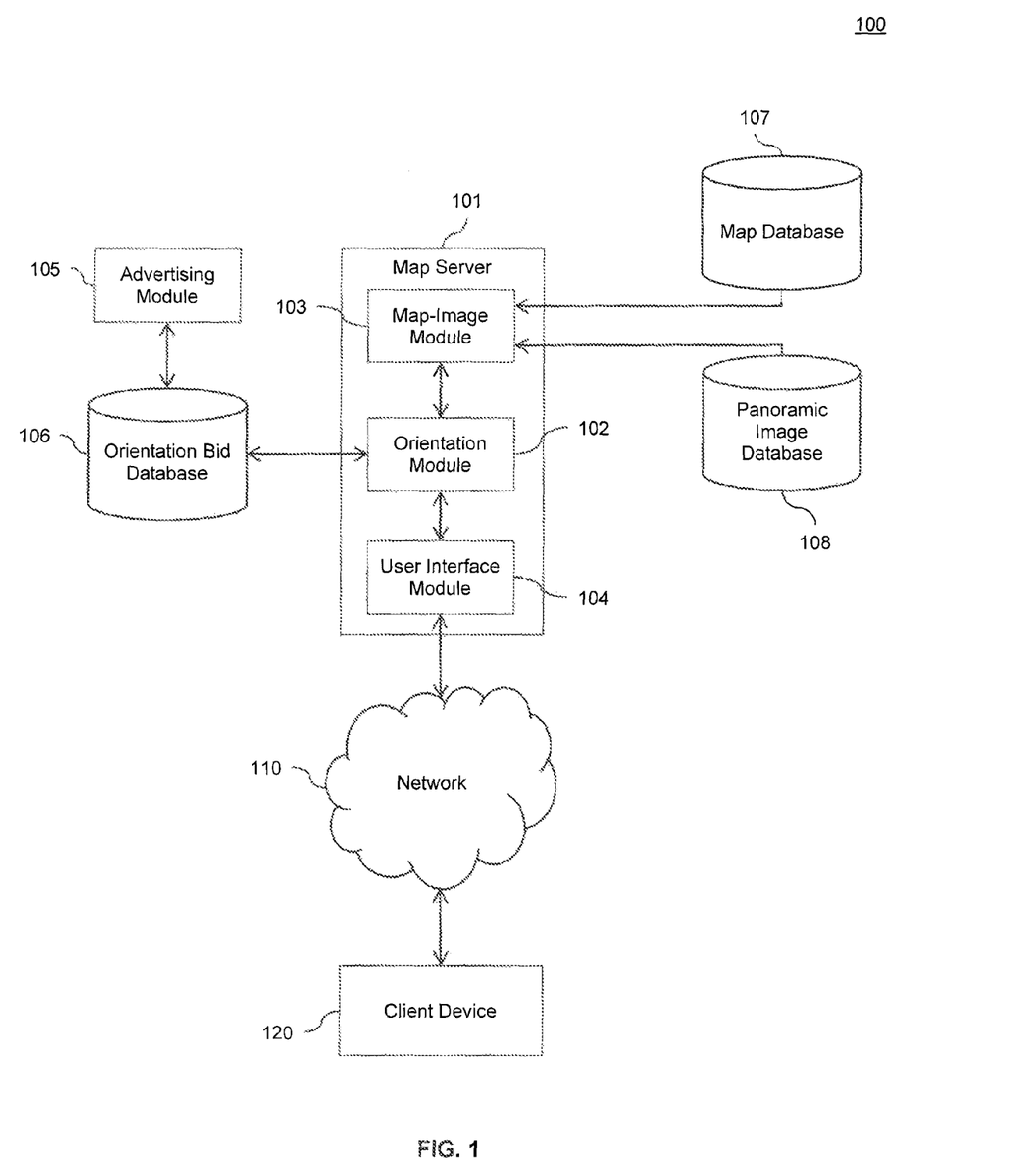
FIG. 1 is an example system environment that may be used to orient a panoramic image of a geolocation to display an advertiser's location.

FIG. 1 is an example system environment that may be used to orient a panoramic image of a geolocation to display an advertiser's location. System 100 includes map server 101. Map server 101 includes orientation module 102, map-image module 103, and user interface module 104. System 100 also includes advertising module 105, orientation bid database 106, map database 107, panoramic image database 108, network 110, and client device 120.

Network 110 can include any network or combination of networks that can carry data communication. These networks can include, for example, a local area network (LAN) or a wide area network (WAN), such as the Internet. LAN and WAN networks can include any combination of wired (e.g., Ethernet) or wireless (e.g., Wi-Fi or 3G) network components.

Client device 120 can include any computing device capable of communicating with a geographic information system ("GIS") including, for example, stationary computing devices (e.g., desktop computers) and mobile computing devices such as, for example, tablets, smartphones, or other network enabled portable digital devices. Mobile computing devices may utilize Global Positioning System ("GPS") data, touch-screen interfaces, and location services to assist with retrieving and displaying geolocation images and advertising units. Map server 101, client device 120, advertising module 105, orientation bid database 106, map database 107, and panoramic image database 108 also can run on any computing device. Each component may run on a distribution of computer devices or a single computer device. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Hardware can include, but is not limited to, a processor, memory and user interface display.

A. Map Server

Map server 101 can be any GIS capable of capturing, storing, manipulating, analyzing, managing, and presenting geographically referenced data. Map server 101 includes orientation module 102, map-image module 103, and user interface module 104. These modules, however, are not intended to limit the embodiments described herein. Consequently, one of skill in the art will readily understand how the functionality described herein may be implemented by using one or more alternative modules.

1. Map-Image Module

Map server 101 includes map-image module 103 that is configured to determine a geolocation of a point on a map, where the point is determined based on a user action. In some embodiments, the user action can include the user choosing a point on a map. The point selected by the user can then be translated to geolocation coordinates. In some embodiments, the user action can include the user selecting a URL link that navigates the user to a webpage that includes a map that references a geolocation or a photographic image of a geolocation. These embodiments are described in more detail in reference to FIGS. 3A, 3B, 3C, 4A, 4B, and 4C, herein.

In some embodiments, the user action can include changes in the user's geolocation. For example, the user's geolocation can be determined based on GPS data collected from client device 120. In some embodiments, the user action can include a touch-screen gesture. For example, the user may view an image of a first geolocation on a mobile device configured to accept touch gestures. The user can then navigate to a second geolocation via a touch gesture such as, for example, panning the image.

In some embodiments, the geolocation is based on a combination of a user action and a zoom factor. For example, when a user selects a point on the map, the point may correspond to multiple geolocations—depending on the zoom level of the map. The zoom level of the map is indicated by the zoom factor, which can be used to determine the number of geolocations that correspond to the selected point. Thus, when the user selects a point on the map that corresponds to multiple geolocations, the zoom factor may be used to determine the geolocation to display from the multiple possibilities.

In some embodiments, the geolocation determination is based on a combination of a user action, a zoom factor, and an orientation bid. Orientation bids are described in more detail below.

Map-image module 103 is also configured to retrieve a panoramic image associated with the determined geolocation. The panoramic image can include either one image or a combination of images with fields of view up to and including 360 degrees. The panoramic image can be associated with one or more geolocations corresponding to the physical location where the image was captured. These geolocations can be used to retrieve the image from a database, such as, for example, panoramic image database 108.

Map-image module 103 may also be configured to retrieve a map or other geographically referenced data. This information may be acquired from a database such as, for example, map database 107. In one embodiment, map-image module 103 retrieves a map and additional data indicating the geolocations on the map that have corresponding panoramic images. The map and additional data may be made available for display to a user via user interface module 104. The additional data is not limited to indicating which geolocations have corresponding panoramic images, but may also include business locations, street names, addresses, traffic information, or other useful geographically referenced data.

2. Orientation Module

Map server 101 also includes orientation module 102 that is configured to retrieve an orientation bid from a collection of orientation bids. Each orientation bid is associated with an advertiser and includes an image orientation direction and a geographical boundary. The image orientation direction is used to determine the panoramic image's initial field of view when the image is displayed. Each orientation bid may also include a bid amount.

The geographical boundary is used to determine whether an orientation bid can be retrieved from the collection of orientation bids. An orientation bid may be retrieved if the associated geographical range encompasses the determined geolocation. In some embodiments, the geographical boundary is defined by a shape such as a circle or other polygon. The shape may be determined by the advertiser based on the advertiser's physical location. Multiple shapes may also be included, where each shape is associated with a unique image orientation direction. In some embodiments, the geographical boundary is a geolocation or a group of geolocations. For example, an advertiser may select one or more geolocations corresponding to one or more physical locations. Each selected geolocation may also be associated with a unique image orientation direction.

The image orientation direction is used to determine the initial orientation for displaying a panoramic image. In some embodiments, the image orientation direction included in the orientation bid is based on a set of latitude and longitude coordinates indicating an advertiser's place of business. For example, if the advertiser creates an orientation bid with a geographical range in the shape of a circle, the advertiser may select the coordinates of a physical place of business as the image orientation direction. Thus, if the orientation bid is retrieved for a determined geolocation, the orientation of the panoramic image is set to display the coordinates of the advertiser's place of business.

In some embodiments, the image orientation direction is based on a number of degrees from a default orientation. For example, a user may specify an image orientation direction of 180 degrees. Thus, if the orientation bid is retrieved for a determined geolocation, the orientation of the panoramic image is set to 180 degrees from the default orientation.

The bid amount is used to determine an amount to charge an advertiser when an orientation bid is retrieved for a determined geolocation. In some embodiments, the advertiser is charged the bid amount. In some embodiments, the advertiser is charged an amount less than the bid amount.

Orientation bids may be stored with a collection of orientation bids in a database such as, for example, orientation bid database 106. An orientation bid may be retrieved from the collection of orientation bids based on one or more factors such as, for example, the determined geolocation, the geographical range or bid amount associated with the orientation bid, information associated with a user, and/or information associated with an advertiser.

In some embodiments, an orientation bid is retrieved based on the bid amount. For example, a group of orientation bids may retrieved from the collection due to each having a geographical range that encompasses the determined geolocation. The orientation bid with the highest bid amount is then retrieved from the group.

In some embodiments, the orientation bid is retrieved based on an auction. The auction may select an orientation bid from a collection of competing orientation bids based on one or more target factors. These target factors may include information associated with the user, information associated with the advertiser, the determined geolocation, the geographic range, and the bid amount.

Target factors may include information associated with a user such as, for example, a user profile. The user profile may store information such as, for example, previous searches conducted by the user, including search results, websites visited by the user, the approximate location of the user, and demographic information about the user. When the user chooses to view a panoramic image of a geolocation, orientation bid module 102 may utilize information in the user's profile to retrieve a targeted orientation bid. For example, a user may choose to view a panoramic image associated with a geolocation based on a search result for hotels. Orientation bid module 102 may then select an orientation bid associated with an advertiser offering hotel services proximate to the geolocation. Once retrieved, the image orientation direction associated with the orientation bid may then be used to set the initial orientation of the panoramic image. Other information associated with a user may be used in a similar fashion to retrieve orientation bids.

Target factors may also include information associated with an advertiser such as, for example, a product or service category, key words, or target demographics. This information may be stored with each orientation bid or may be stored in an advertiser's profile. Orientation bid module 102 may then utilize this information to select an orientation bid targeted to the user based on the determined geolocation. For example, if a user chooses to view a geolocation associated with an advertiser offering hotel services, orientation bid module 102 may select an orientation bid from another advertiser offering hotel services proximate to the same geolocation. Other information associated with an advertiser may be used in a similar fashion to retrieve advertising units.

3. User Interface Module

Map server 101 may optionally include user interface module 104. User interface module 104 is configured to display maps, geographically referenced data, and panoramic images of geolocations provided by map-image module 103. When panoramic images are displayed, the initial orientation is based on an orientation direction associated with an orientation bid retrieved from orientation bid module 102. User interface module 104 may also be configured to allow a user to select geolocations from a map or a URL link. Example embodiments are described in reference to FIGS. 3A-C and 4A-C, herein.

B. Advertising Module

Advertising module 105 is configured to receive an orientation bid from an advertiser. Advertisers may provide one or more orientation bids based on a number of factors including, for example, various business locations, target demographics, service categories, key words, or bid amounts. Advertisers may also use advertising module 105 to manage one or more previously created orientation bids. Advertising module 105 may also store an advertiser profile that can include information associated with the advertiser such as, for example, advertising budgets, payment information, and statistics showing orientation bid selection rates.

Advertisement module 105 may also be configured to charge an advertiser the bid amount associated with a retrieved orientation bid. The bid amount may be deducted from a payment account associated with the advertiser's profile. In some embodiments, an advertiser may establish a maximum campaign budget where the bid amount will continue to be deducted each time an orientation bid is selected until the budget is depleted. Once the budget is depleted, the orientation bid may be ineligible for selection.

Advertisement module 105 may be configured to charge an advertiser an adjusted bid amount based on the bid amount associated with a retrieved orientation bid. In some embodiments, the adjusted bid amount is based on where the determined geolocation falls within the geographical boundary associated with the retrieved orientation bid. In some embodiments, the adjusted bid amount is based on an auction that selects an orientation bid from a collection of orientation bids.

Various aspects of embodiments described herein can be implemented by software, firmware, hardware, or a combination thereof. The embodiments, or portions thereof, can also be implemented as computer-readable code. For example, orientation bid module 102, map-image module 103, user interface module 104, and advertising module 105 may be implemented in one or more computer systems or other processing systems. The embodiment in system 100 is not intended to be limiting in any way.

Example Method Embodiments

Figure 2:
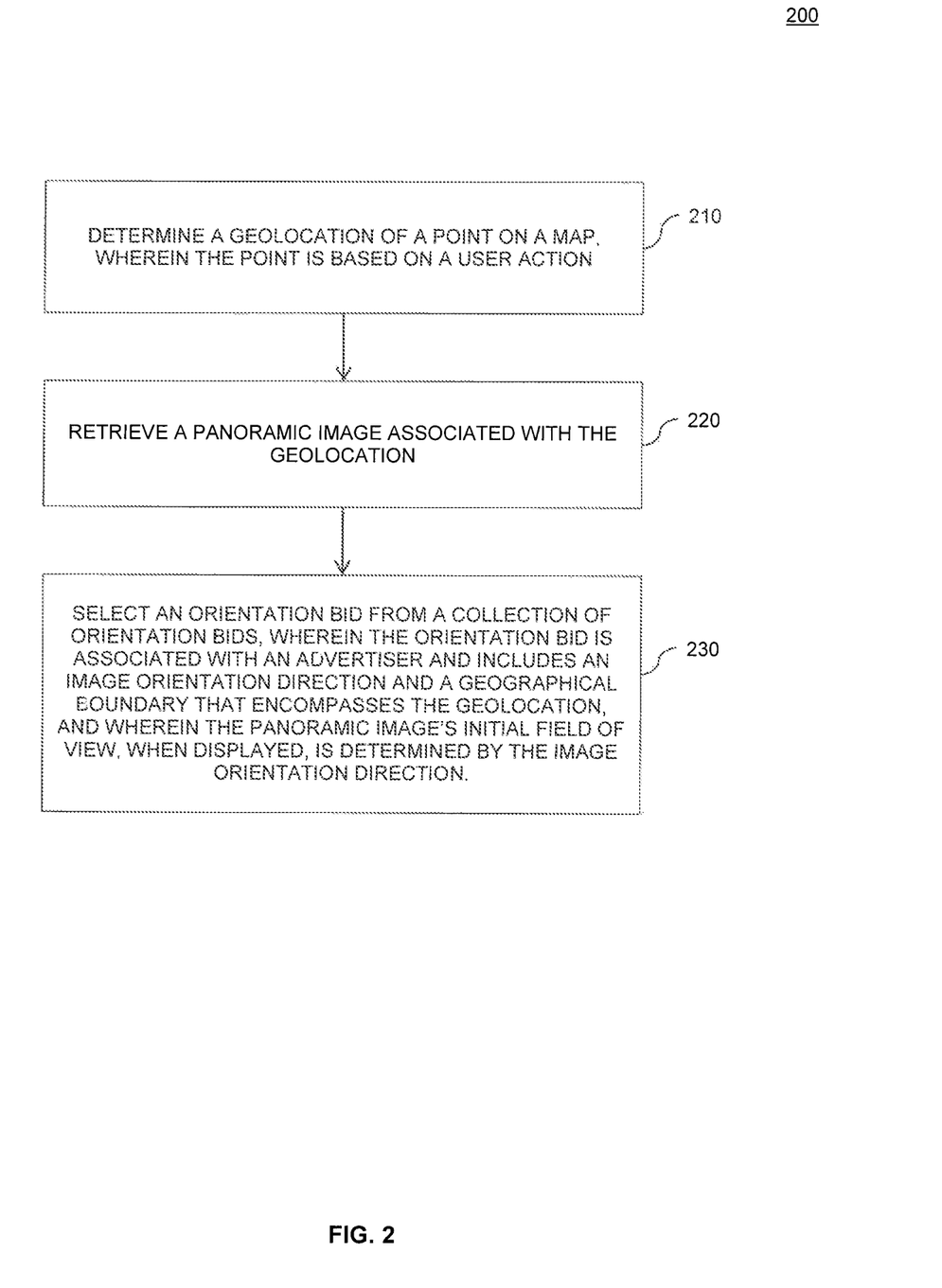
FIG. 2 is a flowchart illustrating an exemplary method that may be used to orient a panoramic image of a geolocation to display an advertiser's location.

FIG. 2 is a flowchart illustrating an exemplary method that may be used to orient a panoramic image of a geolocation to display an advertiser's location. While method 200 is described with respect to an embodiment, method 200 is not meant to be limiting and may be used in other applications. Additionally, method 200 may be carried out by system 100, for example.

Method 200 determines a geolocation of a point on a map, where the point is based on a user action (step 210). In some embodiments, the geolocation is determined from the user selecting a point on a map. In some embodiments, the geolocation is determined from the user selecting a URL link that includes a reference to a geolocation. Step 210 may be carried out by map-image module 103 embodied in system 100, for example.

Method 200 retrieves a panoramic image associated with the geolocation (step 220). The panoramic image may include a combination of multiple images and may include fields of view up to and including 360 degrees. Step 220 may also be carried out by map-image module 103 embodied in system 100, for example.

Method 200 then also retrieves an orientation bid from a collection of orientation bids (step 230). The orientation bid is associated with an advertiser and includes an image orientation direction and a geographical boundary that encompasses the geolocation. The image orientation direction is used to determine the panoramic image's initial field of view when the image is displayed. In some embodiments, the orientation bids are retrieved based on the determined geolocation, information associated with the user, information associated with the advertiser, and/or the outcome of an auction between advertisers. Step 230 may be carried out by orientation module 102 embodied in system 100, for example.

Additional Example Embodiments

Below are example interface embodiments that may be used to implement the embodiments described with reference to system 100 and method 200.

A. Example Zoomed-In Map Interface

Figure 3A:
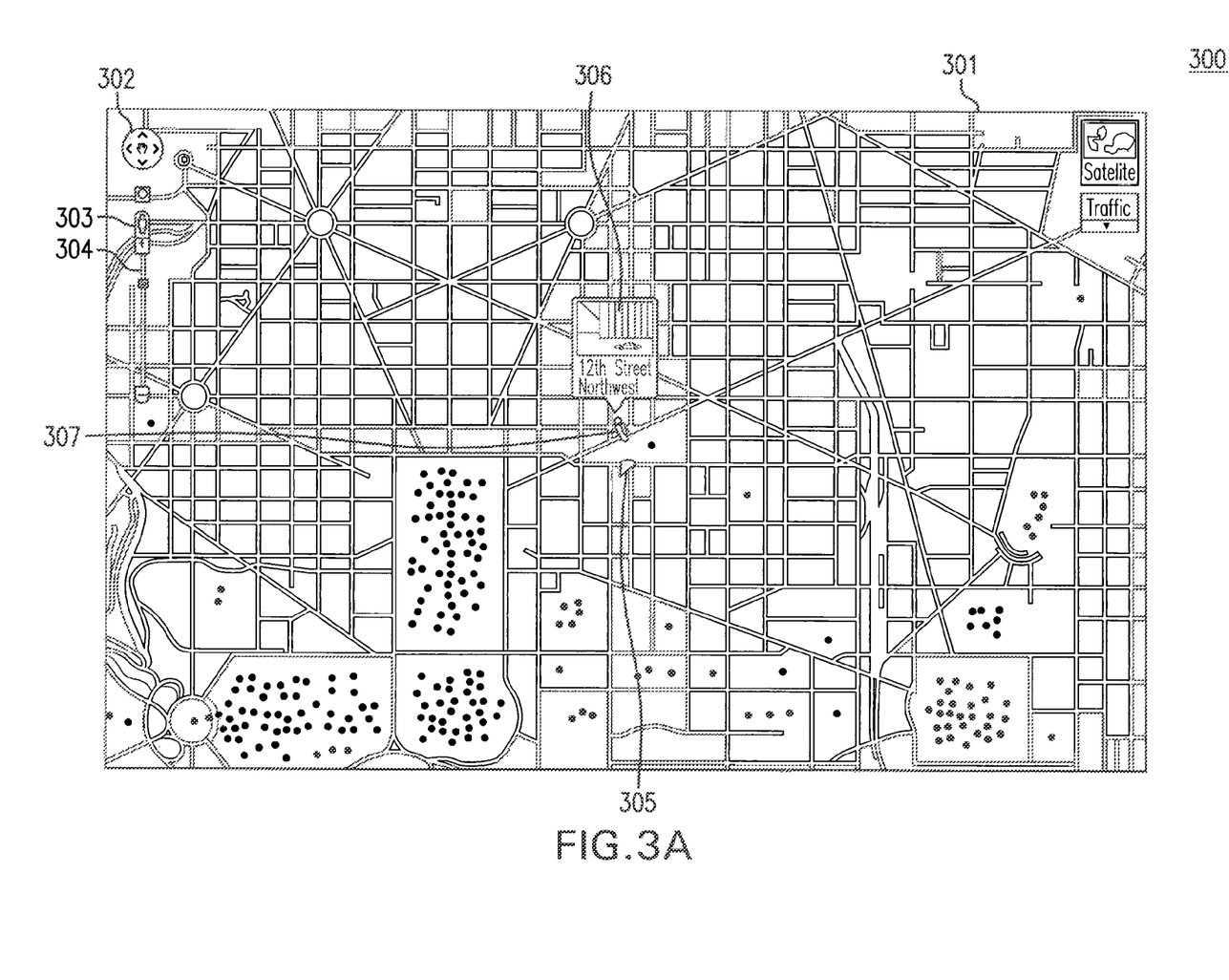
FIG. 3A is an example map interface that may be used to allow a user to select a geolocation, according to one embodiment.

FIG. 3A is an example map interface 300 that may be used to allow a user to select a point that corresponds to a geolocation, according to an embodiment. Map interface 300 includes map 301, compass 302, pegman selector 303, zoom control 304, orientation indicator 305, preview 306, and pegman 307.

In some embodiments, map 301 is retrieved from map database 107 by map-image module 103. Once map 301 is retrieved, it can be displayed to a user by user interface module 104. User interface module 104 may then add one or more interface elements such as, for example, compass 302, pegman selector 303, zoom control 304, orientation indicator 305, preview 306, and pegman 307.

Compass 302 may be used to either rotate map 301 to an alternate orientation or pan map 301. Pegman selector 303 may be used to select pegman 307 for placing onto map 301. Zoom control 304 may be used to change the zoom factor of map 301. Orientation indicator 305 may be used to indicate the anticipated orientation of a image that will be displayed when pegman 307 is placed on map 301. Preview 306 may be used to show a thumbnail image of an image that corresponds to the geolocation indicated by pegman 307. Pegman 307 may be used to select a point on map 301 for which an image of a geolocation that corresponds to the selected point may be retrieved. The image may then be displayed in accordance with, for example, the embodiments in FIGS. 3B and 3C. Some or all of these interface elements may be included in one or more embodiments. Additionally, map interface 300 is not intended to limit the embodiments described herein.

Figure 3B:
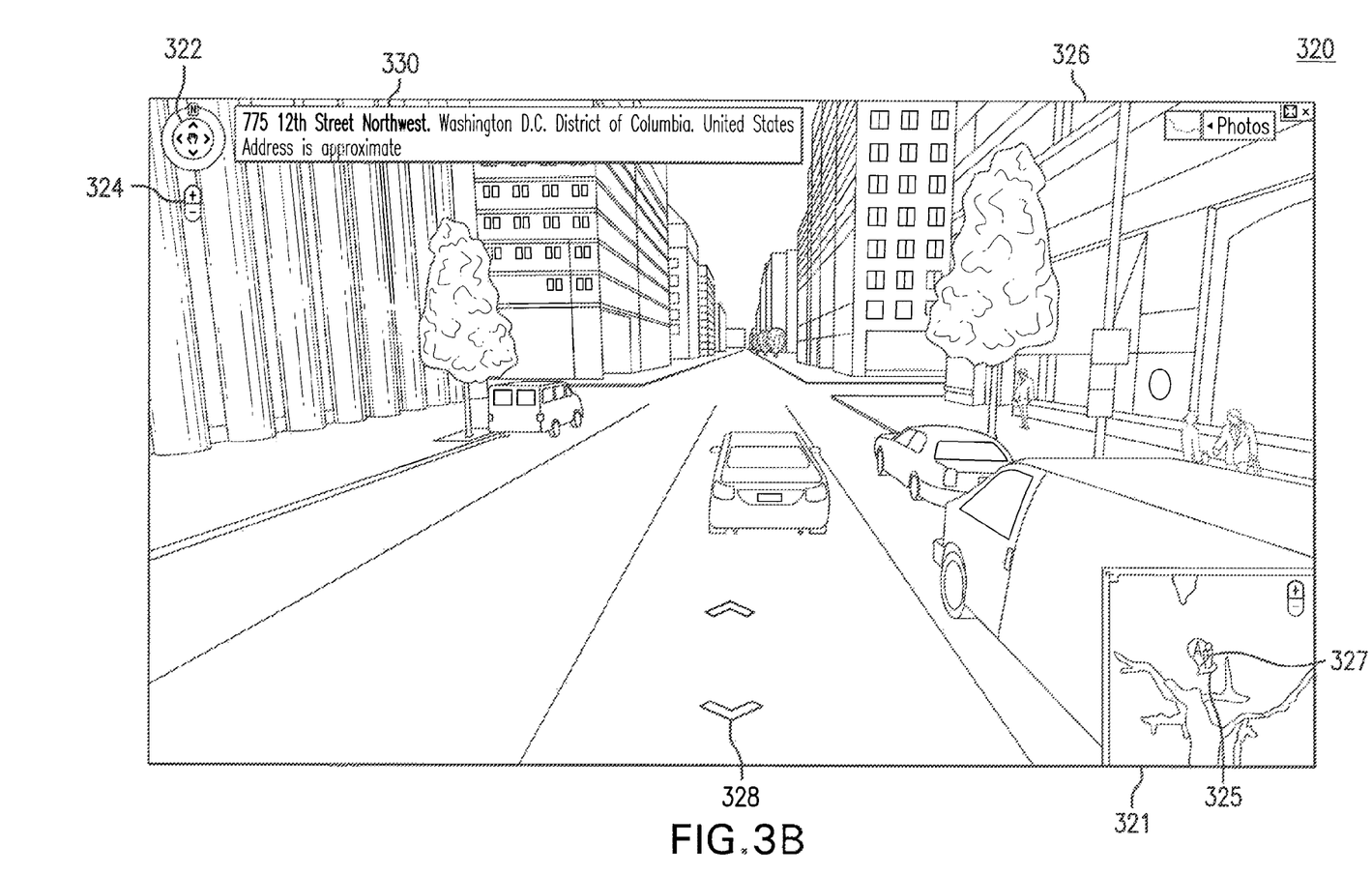
FIG. 3B is an example panoramic interface based on the geolocation selected using the map interface embodied in FIG. 3A that includes a panoramic image oriented to a default direction, according to the prior art.

FIG. 3B is an example panoramic interface 320 based on the geolocation selected using map interface 300 embodied in FIG. 3A. If no orientation bids are available, panoramic image 326 is oriented to a default direction. Panoramic interface 320 includes map 321, compass 322, image zoom control 324, orientation indicator 325, panoramic image 326, pegman 327, navigation controls 328, and address indicator 330.

Compass 322 is used to either rotate map 321 to an alternate orientation or select a new geolocation. Image zoom control 324 is used to change the zoom factor of panoramic image 326. Orientation indicator 325 is used to indicate the orientation of panoramic image 326. Pegman 327 is used to indicate the geolocation on map 321 that corresponds to panoramic image 326. Navigation controls 328 are used to navigate to a neighboring geolocation. Address indicator 320 is used to show the user the address, or an approximate address, of the selected geolocation.

Panoramic image 326 displays the image associated with the geolocation corresponding to the point selected by the user in map interface 300 via pegman 307. Because orientation bids are not used, panoramic image 326 is displayed using the default initial orientation of zero degrees. Here, zero degrees corresponds to a northern direction.

Figure 3C:
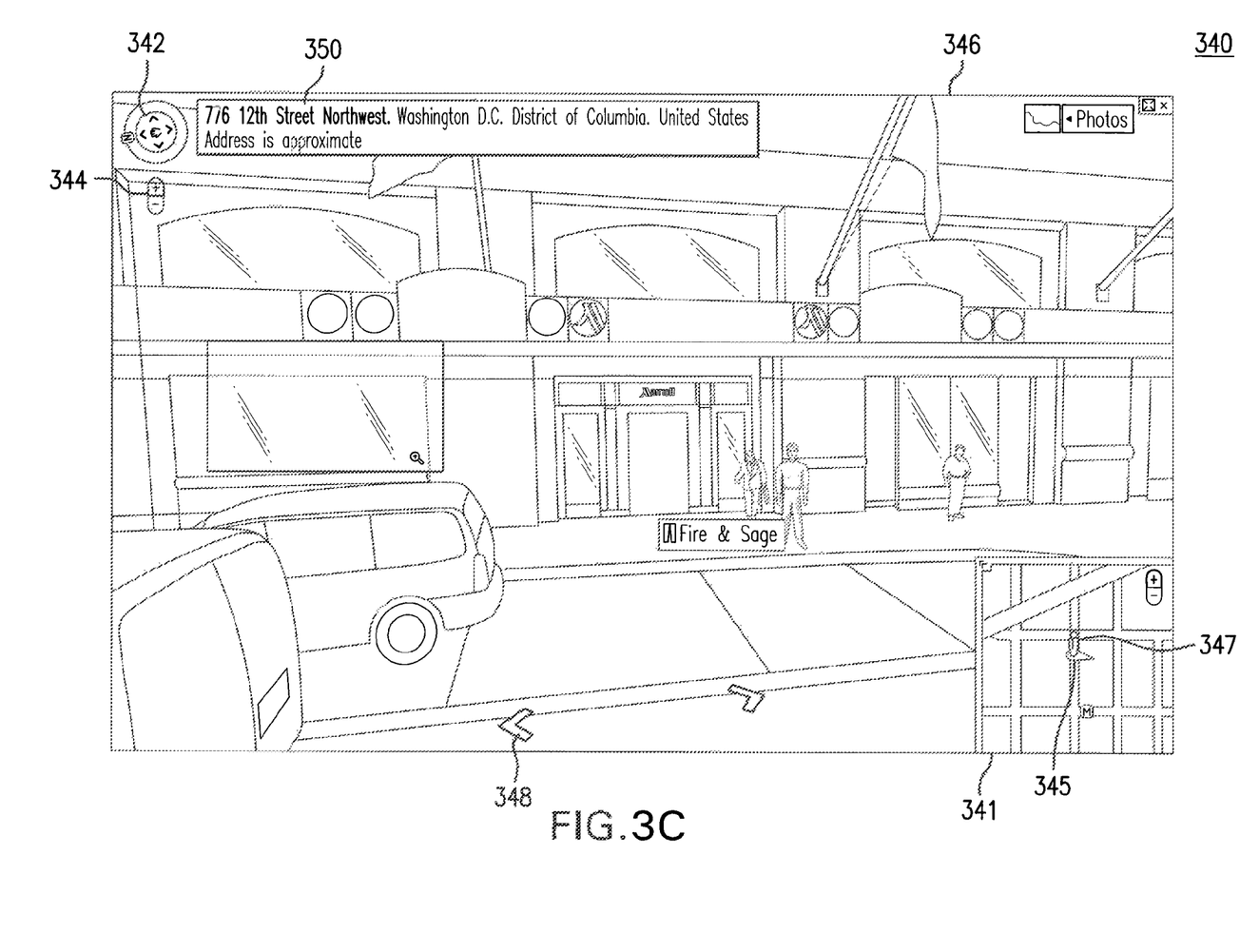
FIG. 3C is an example panoramic interface based on the geolocation selected using the map interface embodied in FIG. 3A that includes a panoramic image oriented to a direction based on an orientation bid, according to one embodiment.

FIG. 3C is an example panoramic interface 340 based on the geolocation selected using map interface 300 embodied in FIG. 3A that includes a panoramic image 346 oriented to a direction based on an orientation bid, according to an embodiment. Panoramic interface 340 includes a number of interface elements that correspond to similar elements from panoramic interface 320 such as map 341, compass 342, image zoom control 344, orientation indicator 345, panoramic image 346, pegman 347, navigation controls 348, and address indicator 350. Orientation indicator 345, however, has been updated to reflect a new initial orientation direction.

Panoramic image 346 may be retrieved from a database such as, for example, panoramic image database 108. In some embodiments, panoramic image 346 displays the image corresponding to the geolocation selected by a user. In this embodiment, for example, panoramic image 346 is retrieved based on the user conducting a search for hotels in the Washington D.C. area and choosing to view the geolocation associated with a hotel appearing in the search results. Because this embodiment utilizes orientation bids, an orientation bid associated with the hotel is retrieved from orientation bid database 106 based on the user choosing to view the geolocation of the hotel. Consequently, the image orientation direction associated with the retrieved orientation sets the initial orientation of panoramic image 346 to the direction of the front of the hotel.

Panoramic interface 340, however, is not intended to limit the embodiment described herein.

B. Example Zoomed-Out Map Interface

Figure 4A:
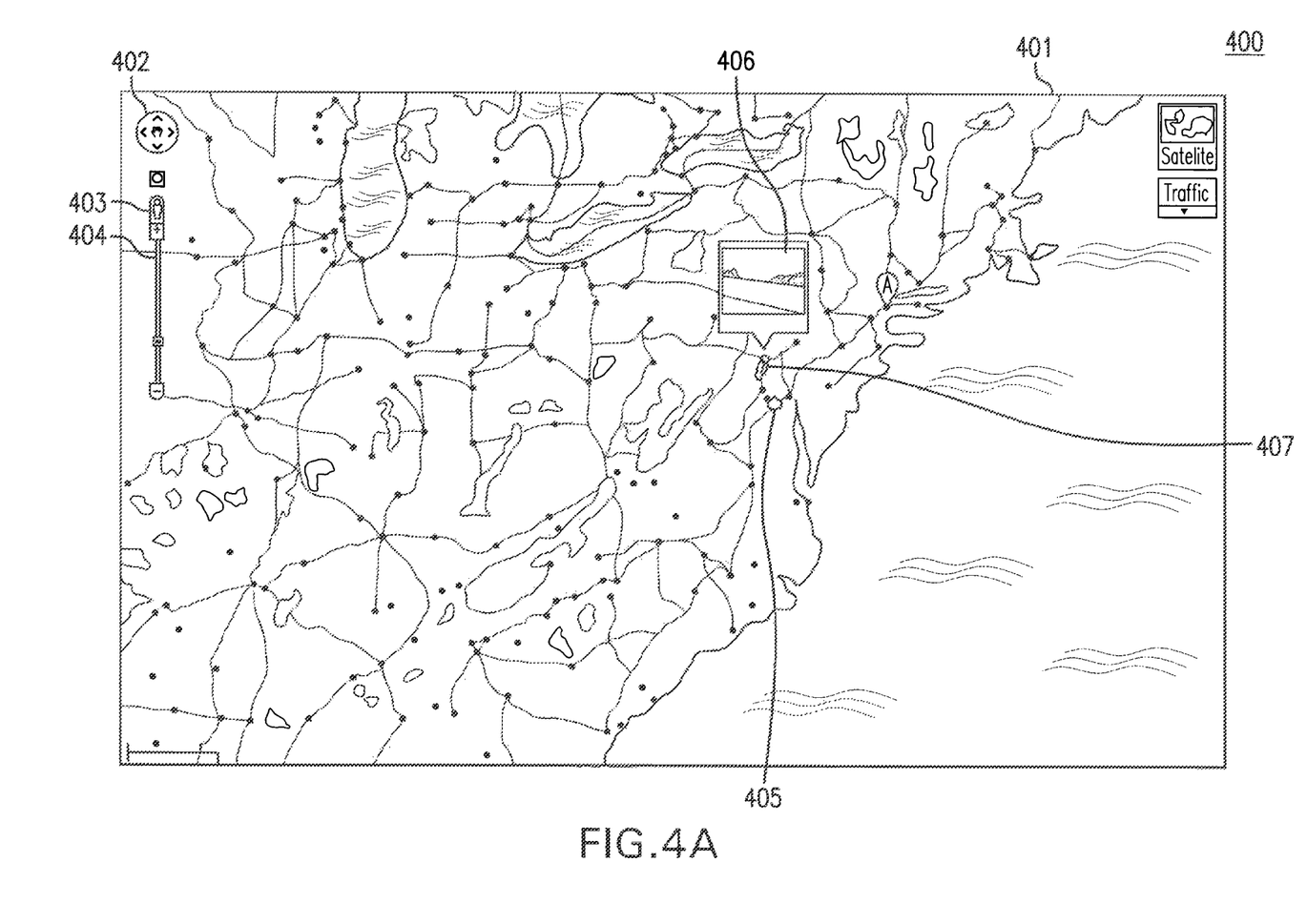
FIG. 4A is an example map interface that may be used to allow a user to select a geolocation, according to one embodiment.

FIG. 4A is an example map interface that may be used to allow a user to select a point that corresponds to a geolocation, according to one embodiment. Map interface 400 includes map 401, compass 402, pegman selector 403, zoom control 404, orientation indicator 405, preview 406, and pegman 407.

In some embodiments, map 401 is retrieved from map database 107 by map-image module 103. Once map 401 is retrieved, it can be displayed to a user by user interface module 104. User interface module 104 may then add one or more interface elements such as, for example, compass 402, pegman selector 403, zoom control 404, orientation indicator 405, preview 406, and pegman 407.

Compass 402 may be used to either rotate map 401 to an alternate orientation or pan map 401. Pegman selector 403 may be used to select pegman 407 for placing onto map 401. Zoom control 404 may be used to change the zoom factor of map 401. Orientation indicator 405 may be used to indicate the anticipated orientation of an image that will be displayed when pegman 407 is placed on map 401. Preview 406 may be used to show a thumbnail image of an image that corresponds to the geolocation indicated by pegman 407. Pegman 407 may be used to select a point on map 401 for which an image of a geolocation that corresponds to the selected point may be retrieved. The image may then be displayed in accordance with, for example, the embodiments in FIGS. 4B and 4C.

Some or all of these interface elements may be included in one or more embodiments. Additionally, map interface 400 is not intended to limit the embodiments described herein.

Figure 4B:
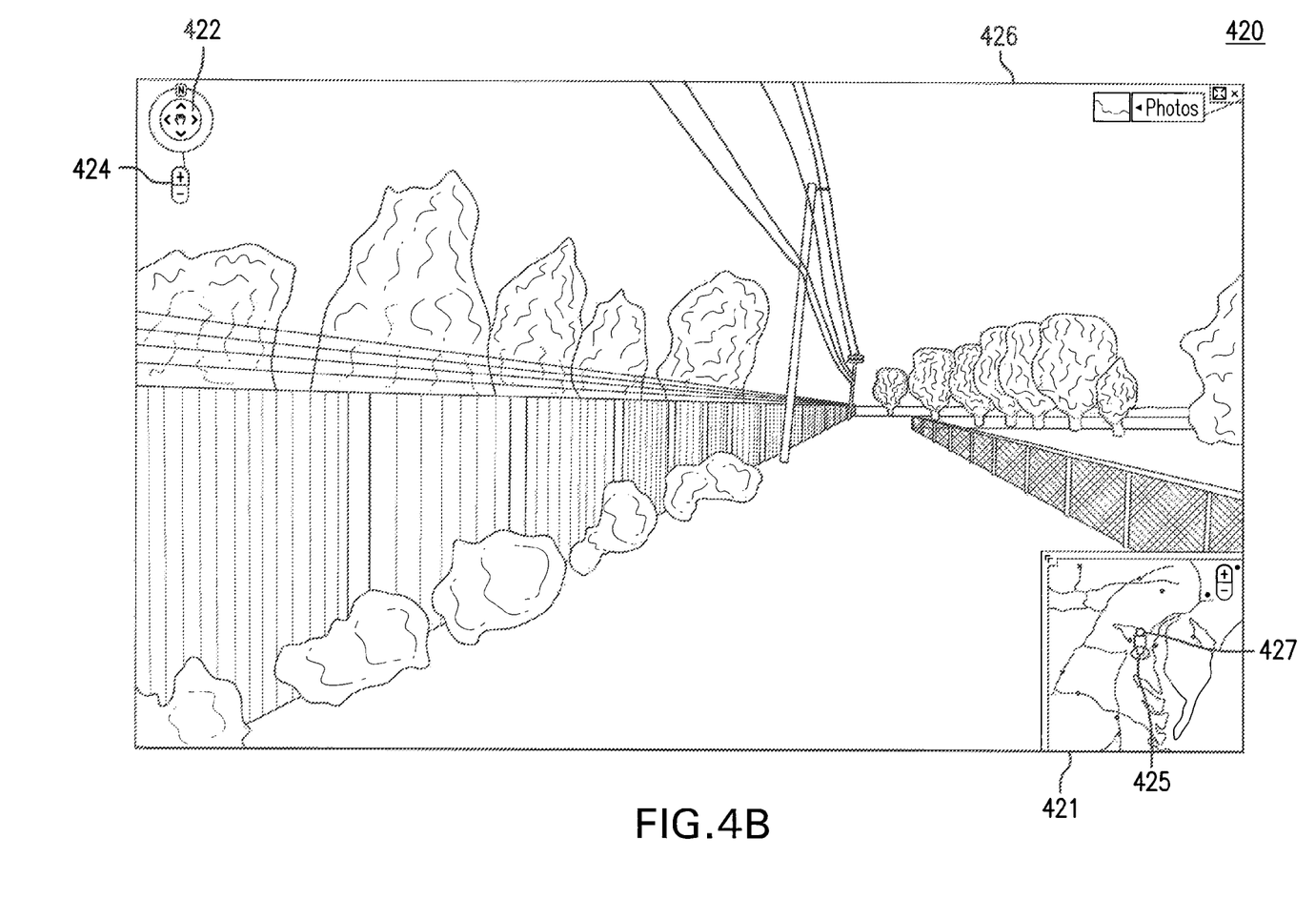
FIG. 4B is an example panoramic interface based on the geolocation selected using the map interface embodied in FIG. 4A that includes a panoramic image oriented to a default direction, according to the prior art.

FIG. 4B is an example panoramic interface 420 based on the geolocation selected using map interface 400 embodied in FIG. 4A. If no orientation bids are available, panoramic image 426 is oriented to a default direction. Panoramic interface 420 includes map 421, compass 422, image zoom control 424, orientation indicator 425, panoramic image 426, pegman 427, navigation controls 428, and address indicator 430.

Compass 422 is used to either rotate the map 421 to an alternate orientation or select a new geolocation. Image zoom control 424 is used to change the zoom factor of panoramic image 426. Orientation indicator 425 is used to indicate the orientation of panoramic image 426. Pegman 427 is used to indicate the geolocation on map 421 that corresponds to panoramic image 426. Navigation controls 428 are used to navigate to a neighboring geolocation. Address indicator 420 is used to show the user the address, or an approximate address, of the selected geolocation.

Panoramic image 426 displays the image associated with the geolocation corresponding to the point selected by the user in map interface 400. Because orientation bids are not used, panoramic image 426 is retrieved based solely on the point selected by the user and displayed using the default initial orientation of zero degrees, which corresponds to a northern direction. Because zoom scale 404 in map interface 400 was set to a high level, multiple geolocations corresponded to the point selected by the user. Consequently, panoramic image 426 was simply retrieved from multiple corresponding panoramic images based on its geolocation being located in the middle of the multiple geolocations.

Figure 4C:
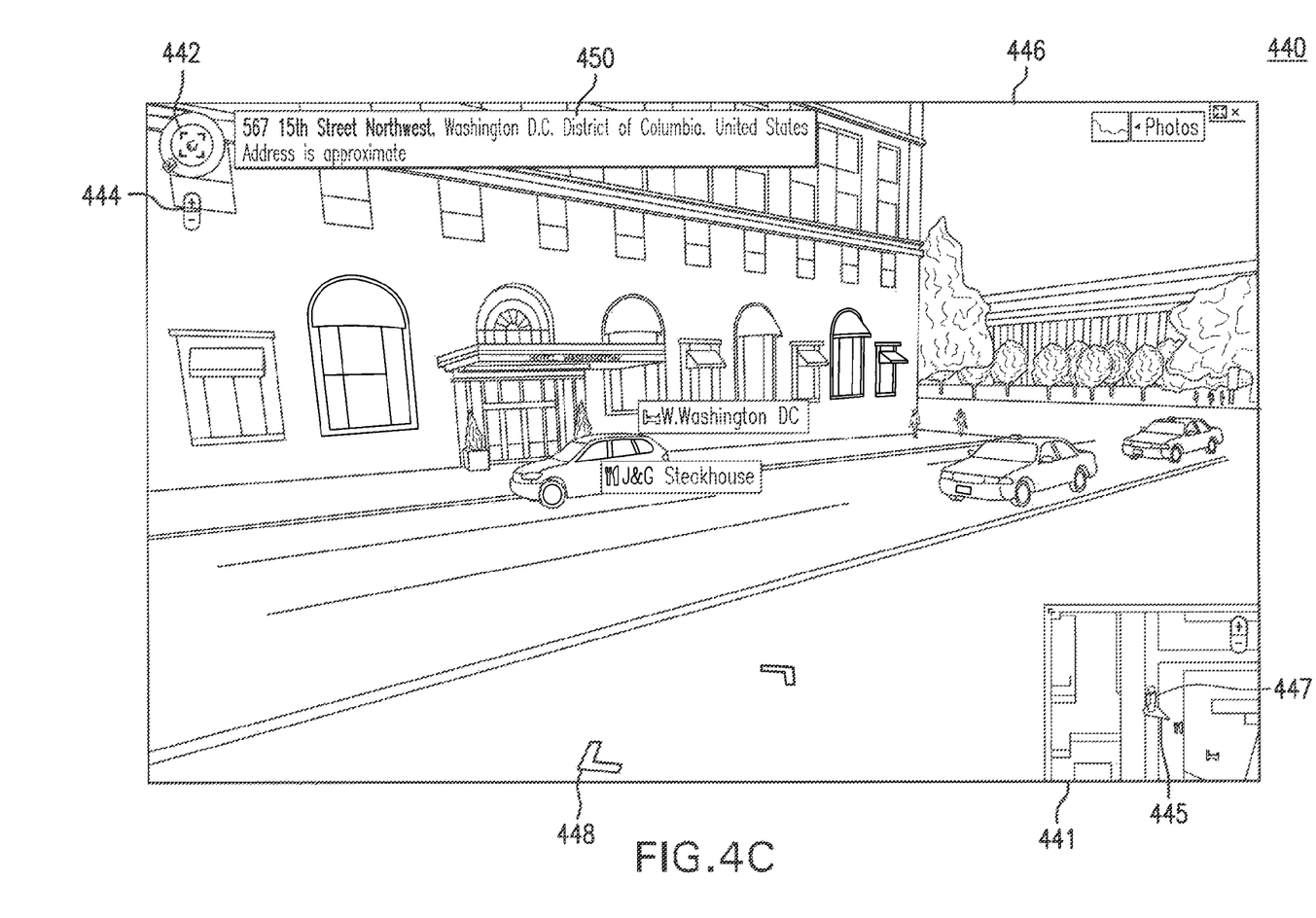
FIG. 4C is an example panoramic interface based on the geolocation selected using the map interface embodied in FIG. 4A that includes a panoramic image oriented to a direction based on an orientation bid, according to one embodiment.

FIG. 4C is an example panoramic interface 440 based on the geolocation selected using map interface 400 embodied in FIG. 4A that includes a panoramic image 446 oriented to a direction based on an orientation bid, according to an embodiment. Panoramic interface 440 includes a number of interface elements that correspond to similar elements from panoramic interface 420 such as map 441, compass 442, image zoom control 444, orientation indicator 445, panoramic image 446, pegman 447, navigation controls 448, and address indicator 450. These interface elements, however, have been updated to reflect a new geolocation and initial orientation direction.

Panoramic image 446 may be retrieved from a database such as, for example, panoramic image database 108. In some embodiments, panoramic image 446 displays the image corresponding to the geolocation selected by a user via pegman 407. In this embodiment, for example, panoramic image 446 is retrieved based on the user selecting a point on map interface 400.

Because zoom scale 404 is set to a high level, however, multiple geolocations correspond to the selected point. Thus, an orientation bid is utilized to select a single geolocation. For example, a group of orientation bids may be initially retrieved based on whether one or more of the multiple geolocations falls within the geographical range associated with an orientation bid. Once the group of orientation bids is located, one orientation bid may be retrieved based on an auction. The winning orientation bid is then utilized to determine the geolocation that best matches the geographical range and image orientation direction associated with the orientation bid. Panoramic image 446 is then retrieved for the determined geolocation and initialized with the image orientation direction.

Panoramic interface 440, is not intended to limit the embodiment described herein.

Example Computer System

Figure 5:
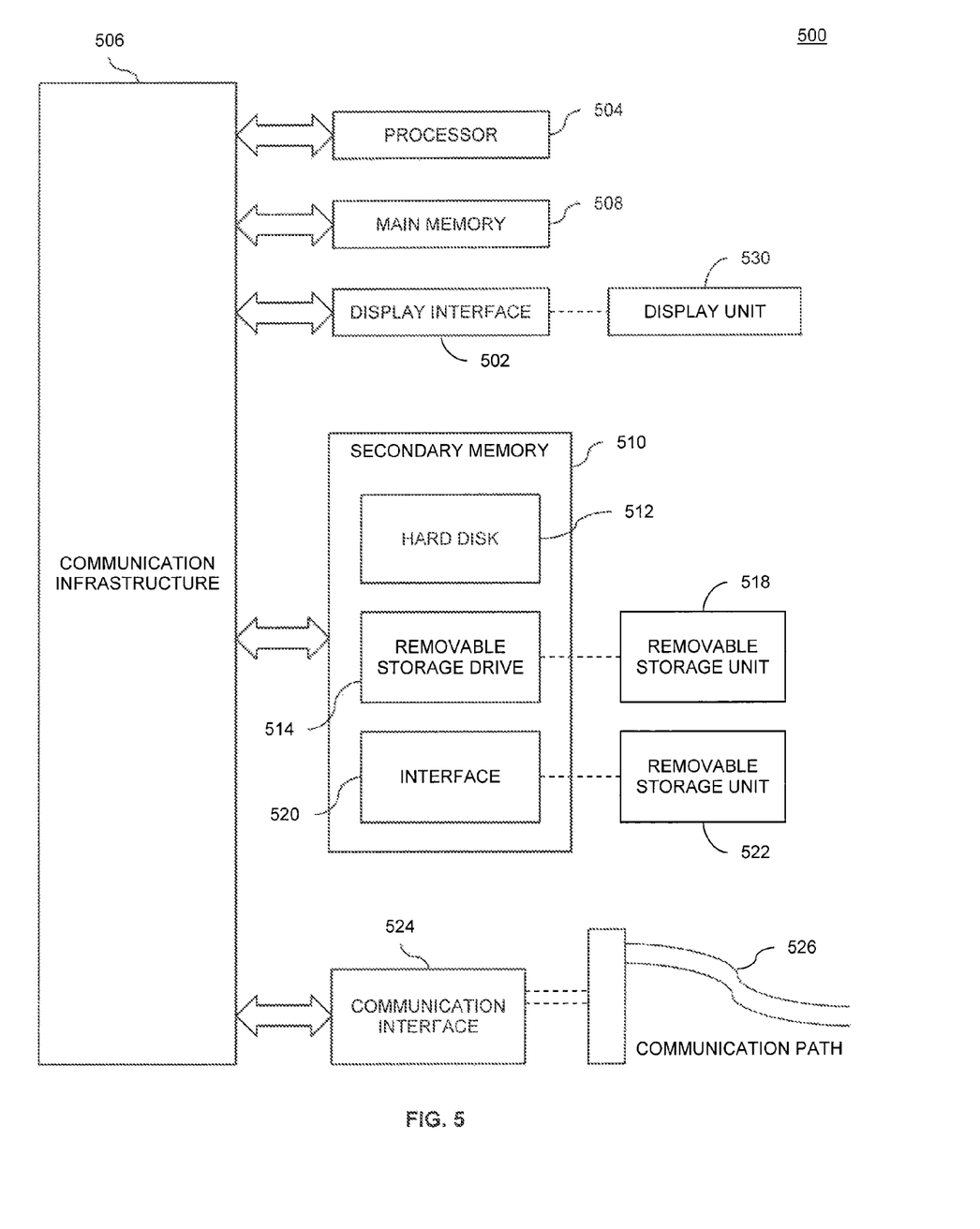
FIG. 5 illustrates an example computer in which embodiments of the present disclosure, or portions thereof, may be implemented as computer-readable code.

FIG. 5 illustrates an example computer system 500 in which embodiments of the present disclosure, or portions thereof, may be implemented. For example, map server 101, advertising module 105, orientation bid database 106, map database 107, panoramic image database 108, and client device 120 may be implemented in one or more computer systems 500 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, and removable storage drive 514. Removable storage drive 514 may include a floppy disk drive, a magnetic tape drive, an optical disk drive, a flash memory drive, or the like. The removable storage drive 514 reads from and/or writes to a removable storage unit 518 in a well-known manner. Removable storage unit 518 may include a floppy disk, magnetic tape, optical disk, flash memory drive, etc. which is read by and written to by removable storage drive 514. As will be appreciated by persons skilled in the relevant art, removable storage unit 518 includes a computer readable storage medium having stored thereon computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 518, removable storage unit 522, and a hard disk installed in hard disk drive 512. Computer storage medium and computer readable storage medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the embodiments described herein. In particular, the computer programs, when executed, enable processor device 504 to implement the processes of the embodiments, such as the stages in the methods illustrated by flowchart 200 of FIG. 2, discussed above. Accordingly, such computer programs represent controllers of computer system 500. Where an embodiment is implemented using software, the software may be stored in a computer storage medium and loaded into computer system 500 using removable storage drive 514, interface 520, and hard disk drive 512, or communications interface 524.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for orienting a panoramic image of a geolocation to display an advertiser's location comprising:
    determining, by at least one computer processor, a geolocation of a point on a map, wherein the point is based on a user action;
    retrieving, by the at least one computer processor, a panoramic image associated with the geolocation;
    selecting, by the at least one computer processor, an orientation bid from a collection of orientation bids, wherein the orientation bid is associated with an advertiser and includes an image orientation direction and a geographical boundary that encompasses the geolocation; and
    providing for presentation on a display of a client device, by the at least one computer processor, the panoramic image's initial field of view, the initial field of view determined by the image orientation direction of the selected orientation bid.

2. The computer-implemented method of claim 1, further comprising:
    receiving the orientation bid from the advertiser, wherein the orientation bid includes a bid amount indicating the amount the advertiser will pay when the orientation bid is selected from the collection of orientation bids.

3. The computer-implemented method of claim 2, further comprising:
    charging the advertiser associated with the orientation bid the bid amount when the orientation bid is selected from the collection of orientation bids.

4. The computer-implemented method of claim 3, further comprising:
    charging the advertiser associated with the orientation bid an adjusted bid amount, wherein the adjusted bid amount is based on where the geolocation associated with the panoramic image falls within the geographical boundary associated with the orientation bid.

5. The computer-implemented method of claim 1, wherein the orientation bid is selected based on the highest bid amount.

6. The computer-implemented method of claim 1, wherein the geolocation is determined based on a combination of a zoom factor of the map and an orientation bid with the geolocation boundary encompassing the geolocation.

7. The computer-implemented method of claim 1, wherein the orientation bid is selected based on an auction that selects the orientation bid from a collection of competing orientation bids based on one or more target factors, the target factors including information associated with the user, information associated with the advertiser, the geolocation of the panoramic image, the geographic boundary associated with each orientation bid and the bid amount associated with each orientation bid.

8. A system for orienting a panoramic image of a geolocation to display an advertiser's location comprising:

a map-image module, implemented on at least one computer processor, configured to:
  determine a geolocation of a point on a map, wherein the point is based on a user action; and
  retrieve a panoramic image associated with the geolocation; and
an orientation module, implemented on the at least one computer processor, configured to;
  select an orientation bid from a collection of orientation bids, wherein the orientation bid is associated with an advertiser and includes an image orientation direction and a geographical boundary that encompasses the geolocation; and
  provide for presentation on a display of a client device, the panoramic image's initial field of view, the initial field of view determined by the image orientation direction of the selected orientation bid.

9. The system of claim 8, further comprising:
an advertising module configured to receive the orientation bid from the advertiser, wherein the orientation bid includes a bid amount indicating the amount the advertiser will pay when the orientation bid is retrieved from the collection of orientation bids.

10. The system of claim 9, wherein the advertisement module is further configured to charge the advertiser associated with the orientation bid the bid amount when the orientation bid is retrieved from the collection of orientation bids.

11. The system of claim 10, wherein the advertisement module is further configured to charge the advertiser associated with the orientation bid an adjusted bid amount, wherein the adjusted bid amount is based on where the geolocation associated with the panoramic image falls within the geographical boundary associated with the orientation bid.

12. The system of claim 8, wherein the orientation module is further configured to select the orientation bid based on the highest bid amount.

13. The system of claim 8, wherein the map-image module is further configured to determine the geolocation based on a combination of a zoom factor of the map and an orientation bid with the geolocation boundary encompassing the geolocation.

14. The system of claim 8, wherein the orientation module is further configured to select the orientation bid based on an auction that selects the orientation bid from a collection of competing orientation bids based on one or more target factors, the target factors including information associated with the user, information associated with the advertiser, the geolocation of the panoramic image, the geographic boundary associated with each orientation bid, and the bid amount associated with each orientation bid.

15. An apparatus comprising a computer non-transitory readable storage medium having instructions encoded thereon that, when executed by a computing device, causes the computing device to perform operations comprising:
  determining a geolocation of a point on a map, wherein the point is based on a user action;
  retrieving a panoramic image associated with the geolocation;
  selecting an orientation bid from a collection of orientation bids, wherein the orientation bid is associated with an advertiser and includes an image orientation direction and a geographical boundary that encompasses the geolocation; and
  providing for presentation on a display of a client device the panoramic image's initial field of view, the initial field of view determined by the image orientation direction of the selected orientation bid.

16. The apparatus of claim 15, the apparatus further comprising:
receiving the orientation bid from the advertiser, wherein the orientation bid includes a bid amount indicating the amount the advertiser will pay when the orientation bid is retrieved from the collection of orientation bids.

17. The apparatus of claim 16, the apparatus further comprising:
charging the advertiser associated with the orientation bid the bid amount when the orientation bid is retrieved from the collection of orientation bids.

18. The apparatus of claim 17, the apparatus further comprising:
charging the advertiser associated with the orientation bid an adjusted bid amount, wherein the adjusted bid amount is based on where the geolocation associated with the panoramic image falls within the geographical boundary associated with the orientation bid.

19. The apparatus of claim 15, wherein the orientation bid is retrieved based on the highest bid amount.

20. The apparatus of claim 15, wherein the geolocation is determined based on a combination of a zoom factor of the map and an orientation bid with the geolocation boundary encompassing the geolocation.

21. The apparatus of claim 15, wherein the orientation bid is retrieved based on an auction that selects the orientation bid from a collection of competing orientation bids based on one or more target factors, the target factors including information associated with the user, information associated with the advertiser, the geolocation of the panoramic image, the geographic boundary associated with each orientation bid and the bid amount associated with each orientation bid.

* * * * *